United States Patent [19]
Samworth

[11] Patent Number: 5,953,498
[45] Date of Patent: Sep. 14, 1999

[54] NONLINER CALIBRATION OF OUTPUT DEVICES

[75] Inventor: Mark R. Samworth, Wilmington, Del.

[73] Assignee: Professional Software Technologies, Inc., Bristol, Pa.

[21] Appl. No.: 08/850,687

[22] Filed: May 2, 1997

[51] Int. Cl.⁶ .............................. G06F 15/00; H04N 1/21; H04N 1/41; H04N 1/46
[52] U.S. Cl. ......................... 395/109; 395/102; 358/298; 358/429; 358/455; 358/456; 358/534
[58] Field of Search ..................................... 395/101, 109, 395/102; 358/298, 429, 455, 456, 459, 461, 534, 536

[56] References Cited

U.S. PATENT DOCUMENTS

| | | | |
|---|---|---|---|
| 5,532,849 | 7/1996 | McIntyre et al. | 358/534 |
| 5,786,843 | 7/1998 | Venkateswar | 358/455 |
| 5,818,604 | 10/1998 | Delabastita et al. | 358/298 |

Primary Examiner—Edward L. Coles
Assistant Examiner—Mark Wallerson
Attorney, Agent, or Firm—John J. Simkanich

[57] ABSTRACT

A method for the nonlinear calibration of digital image data without the introduction of tonal loss is applied to image data in a computer-to-printing press system. Apparatus for implementing this method is provided. Computer processed graphics, provided from the computer in 8-bit format, are converted into 16-bit format. This 16-bit image data is then calibrated to compensate for anticipated press gain. The calibration translates the image data according to a desired nonlinear cutback (value reduction) curve of gray value reduction. Calibrated image data is then passed through 16-bit halftoning screening, the output from which is provided to the imagesetter. The implemention may include a general purpose computer with specific software resident therein, or dedicated hardware including a series of encoders and look-up table implementaion devices. Alternatively, or supplementally, the laser exposure in the image setter may be increased to contribute substitute or supplemental analog nonlinear gray value reduction.

5 Claims, 6 Drawing Sheets

NONLINER CALIBRATION OF OUTPUT DEVICES

BACKGROUND OF THE INVENTION

The present invention is directed to the field of image processing, and more specifically to graphics data processing and output data calibration in a desktop computer-to-imagesetter/flexo-printer system.

Data calibration is of interest because of press gain variances with various image presentations. Prior to digital imaging, press gain was compensated by a press operator who adjusted the press settings throughout a series of proofing runs, until a desirable print was obtained. With the introduction of computers into printing, and with computer assisted imaging, calibration for a specific "run", i.e., image to be printed, has been attempted by electronic and computer calibration of the image data itself. This calibration changes the true image data to translated data, which when used by the printing equipment produces a true reproduction of the original image.

Film and plate printers, including flexo-printers, typically received graphics information (image data) from an imagesetter. An imagesetter is a processor based machine which images films or plates to be printed on a printer, such as a flexographic press. The imagesetter images on a bit by bit basis. Its ability to image is independent of image data word length, as it serially processes. Image data provided to the imagesetter often comes from a desktop publishing computer.

Desktop publishing and binary printing processes operate with digital information and digital graphic presentations from the press. Continuous gray level information is simulated using halftone dots. Halftoning is a computer graphics technique for displaying an image, with gray levels, on a binary imaging device (such as a flexographic printer, i.e., flexo-press) in which the gray levels are approximated by variable-sized black and white dots. The image presentation is achieved by changing percentage area coverage from region to region.

A gray code, in computer mathematics, is a binary code in which sequential numbers are represented by binary expressions, each sequential one of which differs from the preceding by one place, only. Gray level is the value associated with a pixel in a digital image, representing the brightness of the original scene in the vicinity of the point represented by the pixel. This translates to a direct relationship to dot size or percent area covered. Gray scale is an optical pattern in discrete steps between light and dark bearing on resolution.

Color images are created by combining gray scale values of a number of selected component colors. Typical component colors, often selected in the industry for hard copy print operations, may be cyan, magenta, yellow and black (CMYK). An individual component color, such as cyan is represented with digital information being a series of gray values represented by 8-bit numbers ranging from 0 to 255. A CMYK image can be generated through the combination of four gray scales images, one for each component color (CMYK).

The Flexographic Trade Association (FTA) in conjunction with the International Standards Organization (ISO) have standardized a gray scale of 0 to 100 to indicate tone or percentage of area covered from 0 to 100 percent. Consequently, 8-bit "words" which have a numbering capacity of 0–255 are quite adequate for defining gray scale values. As a result many, if not most, of the commercially available graphics programs provide 8-bit image data. While some of these commercial graphics programs have incorporated output scaling to compensate for press gain, such scaling calibration is done on 8-bit graphics data which results in lesser quality imaging at the press because of gray scale tonal loss.

As an alternative to these methods, attempts have been made to calibrate the imagesetter itself to compensate for press gain. An imagesetter is considered to calibrated if each continuous tone gray level in the computer produces a halftone dot of the same gray value at the press. This calibration adjustment has been attempted with the use of a "cutback" curve. This cutback curve is an analog plot (curve) of instantaneous gray level reduction as applied to the 8-bit image data being processed by the imagesetter, i.e., the cutback curve results in each dot gray value being downwardly adjusted as function of the nearest 8-bit level approximation to the cutback curve.

While this has produced enhanced results at the press over no calibration, there is again an inherent gray level tonal loss which reduces press image quality. Over any range in the cutback curve, where the slope is less than 1 (45 degrees), the application of a cutback curve will result in 2 different input gray levels being assigned to a same 1 output gray level.

Gray level loss is particularly detrimental when a cutback curve is employed to alter 8-bit digital data for flexographic printing. With such a curve, in the gray scale range of 0 to 8 (percent) the average slope is about ¼. The result is that each "4 input" gray levels are reduced to "1 output" gray level. Hence, the twenty 8-bit gray values that exist between 0 and 8 percent are reduced to 5 output gray values.

A standard accepted by the ISO as the minimum (color difference detectable to the eye is known as "delta" E. One delta E is a "noticeable visual color difference". Therefore, to render an image on a press with a continuous tone appearance, it is required that 2 digital gray values produce less than 1 delta E difference on the printed sheet. With flexographic printing, the 5 gray values between 0 and 2 percent on the gray scale correspond to a delta E range of about 10. This means that each 8-bit digital gray level difference corresponds to a 2 delta E difference on the printed sheet, and produces a quite distinct step pattern.

What is desired is a method and apparatus for calibrating an imagesetter output to compensate for press gain in printing digital images.

What is secondly desired is such a method and apparatus which operates apart from the imagesetter internal data processor.

What is even further desired is a method and apparatus for effecting such imagesetter calibration by the manipulation of the digital image data prior to being input to the imagesetter.

What is also desired is such manipulation of the digital image data which does not cause a degradation at press of the properly calibrated printed digital image over the entire gray scale.

SUMMARY OF THE INVENTION

Objectives of of the present invention are realized in a method and apparatus for adjusting each gray value comprising the data of a digital image, to compensate for press gain at print. Eight bit image data provided by a desktop publishing computer is processed prior to being provided to an imagesetter, which imagesetter then feeds the press, such as a flexographic printer.

The computer provided image data in 8-bit format is converted to 16-bit gray level data. A calibration step is then applied to the image data at a 16-bit resolution level. This calibration is conducted according to an analog cutback curve selected from a library of curves. The calibration proceeds according to 16-bit approximations to the analog curve.

Once the image data has been calibrated to a lower gray value it is passed through a 16-bit halftone screen which converts it into cluster dot (AM screening) or dispersed dot FM screening) information, depending upon the type of screen pattern used. The halftone image data is then feed to imagesetter. No further digital signal level calibration need be done to compensate for press gain.

However, the laser exposure intensity of the imagesetter may be adjusted from a setting 3.0 which approximates a linear performance of the imagesetter, to a setting of 4.5 or more which introduces a series of natural cutback curve effects on the imagesetter output over the gray scale. As the imagesetter laser exposure adjustments and the resultant effective cutback curve introduced into the imagesetter performance are empirically determined, this method of calibration to off-set anticipated press gain is used supplementally or as an alternative to that electronically implemented above.

DESCRIPTION OF THE DRAWINGS

The features, advantages and operation of the present invention will become readily apparent and further understood from a reading of the following detailed description with the accompanying drawings, in which like numerals refer to like elements, and in which.

DETAILED DESCRIPTION OF THE INVENTION

The present invention is a method and apparatus for adjusting each gray value represented in a digital image provided from a desktop publishing computer or other 8-bit digital data source. This adjustment compensates for tonal loss when intensity cutback of gray tone levels is employed to compensate press gain at print.

Printers, such as flexo-presses, are used to print images in which the image information has been digitalized during processing and during printing. Such systems often obtain digital image data from a desktop computer and print the image in digital format at the press. The film or plate image is prepared for the press by an imagesetter, which resides intermediate the output of the desktop computer and the press.

Digital image printing takes the form of dot screen imaging. Two known formats are AM and FM screening, where AM produces a dispersed dot pattern and FM produces a cluster dot pattern at the press. The percentage of area covered produces gray level intensity. In such halftone screening, intensity has been standardized to be measured on a gray scale extending from 0 percent to 100 percent.

Figure 1:
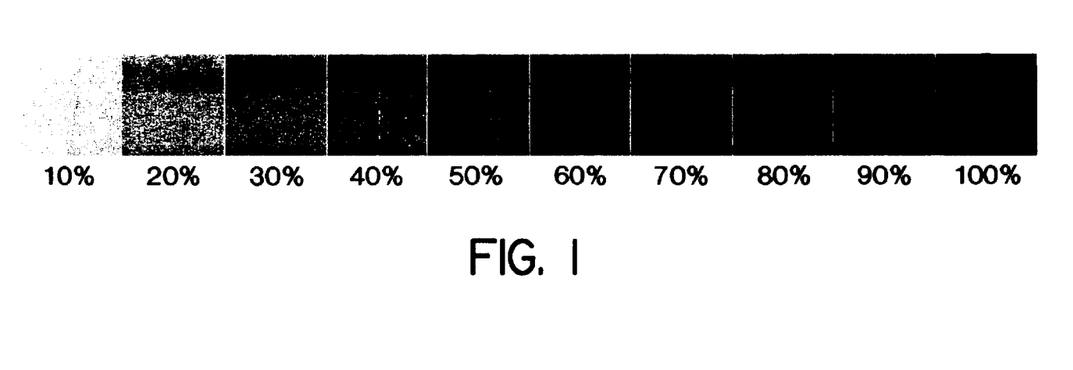
FIG. 1 shows an incremented gray tone output at the press for standard analog image setter calibration.

FIG. 1 shows an example of a continuous gray level in a computer which has been used to produce a series of increments of gray level or intensity, these being incremented by 10 from 10 percent to 100 percent. The printed segments of FIG. 1 have been printed with halftone dot patterns.

Figure 2:
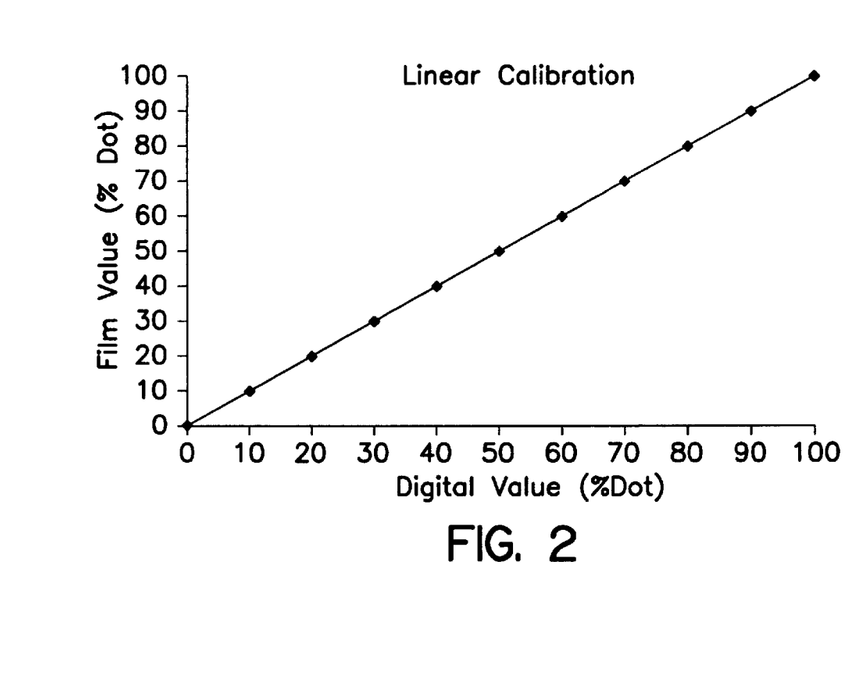
FIG. 2 shows a linear calibration curve for an imagesetter in analog or unattenuated signal processing modes.
Figure 3:
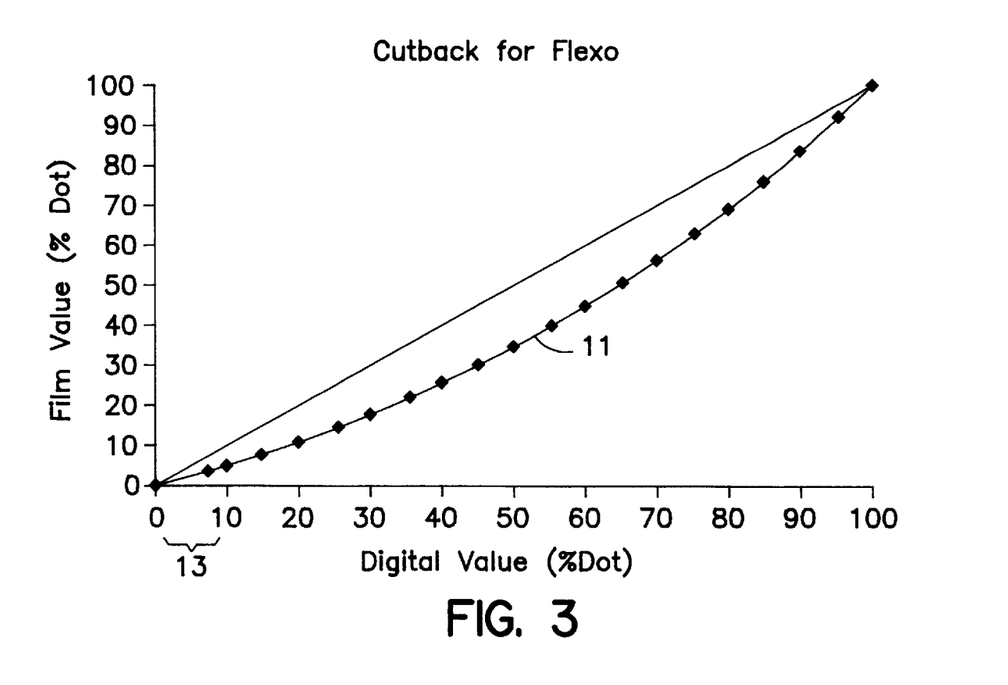
FIG. 3 shows a cutback attenuation curve which has been determined to be acceptable for flexo-press printing.

An imagesetter which feeds the press, is ideally calibrated to a linear calibration output, FIG. 2. Linear calibration means that a digital dot value of 50 percent input to the image setter produces a film or plate value of 50 percent at the press. However, because of press gain in printing halftone dots, a theoretical cutback curve, i.e., varying the attenuation of image data gray values depending upon gray scale position, has been developed. The curve 11 shown in FIG. 3 is such a cutback curve for cluster dot (AM) halftoning (halftone screening).

Figure 4:
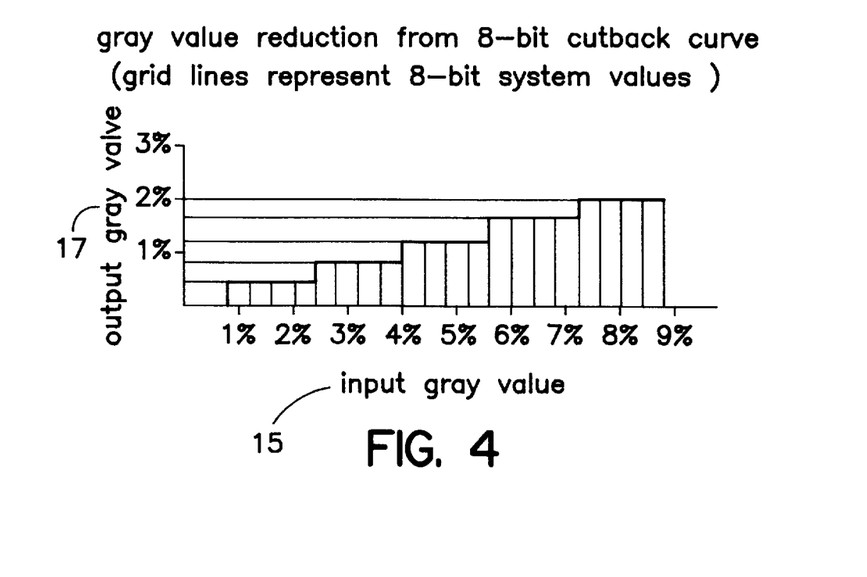
FIG. 4 shows gray level reduction from 8-bit cutback curve calibration.

The lower end of the gray scale is very visually sensitive. This is noticeable from viewing the visual differences between the 10 percent and 20 percent segments of FIG. 1 and the 80 percent and 90 percent segments of that figure. The sensitive portion 13 of the cutback calibration curve 11, FIG. 3, is shown in enlarged detail in FIG. 4, when implemented in an 8-bit processing. At that section 13 of the calibration curve 11, input gray values from 1 through 9 percent are plotted against calibrated output values 17, FIG. 4.

Mathematically examining any region of the curve 11 which is reasonably shallow will produce the analysis that cutback calibration of 8-bit image data must in those regions introduce considerable imaging errors by reducing image information. This results in a tonal loss at the press. Such effect is less pronounced in steeper sloped regions of the curve 11, but does exist to some degree where the instantaneous slope falls below 1 (45 degree incline). As the slope in this area is about ¼, each 4 input gray levels are reduced to 1 output level. Therefore, the 20 gray values in 8-bit format which exist in the gray scale region 13 from 0 to 8 percent are reduced to only 5 gray output values when calibrated using the curve 11.

Figure 5:
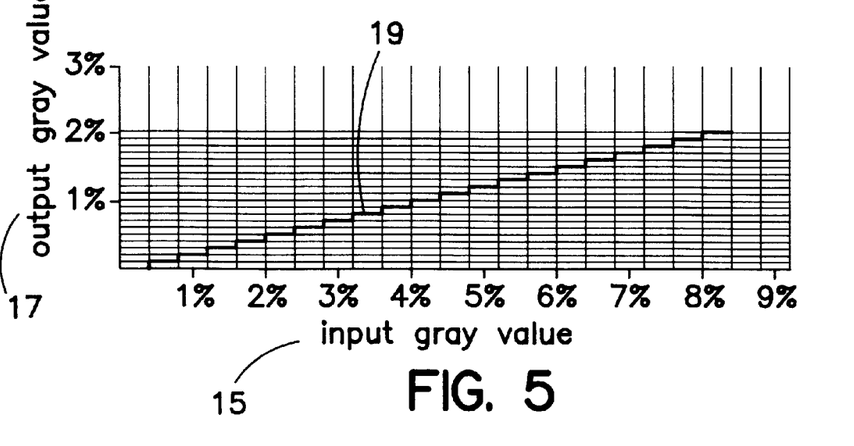
FIG. 5 demonstrates how the digital attenuation calibration approaches the ideal as the halftone data and halftone screening becomes finer or contains more discrete levels of processing.
Figure 6:
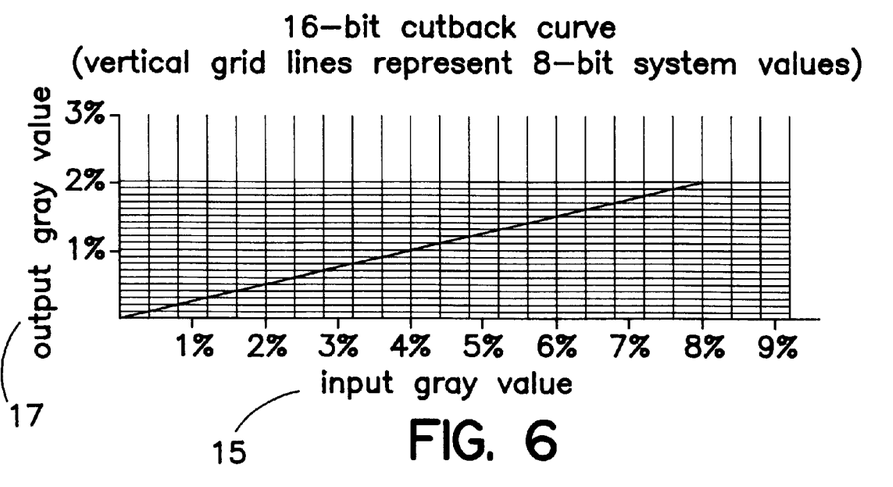
FIG. 6 demonstrates 16-bit cutback curve calibration.

While the use of the cutback curve 11 is necessary, the tonal loss at press output should not be. When the processing of the calibration operation is done at more finely incremented values 19, FIG. 5, the translation from input 15 gray level to output 17 gray level is not as condensed as in FIG. 4, and tonal loss is reduced. The calibration utilizing the cutback curve 11 in a 16-bit environment, i.e., processing 16-bit gray scale data, eliminates all or most of the translation errors introduced in 8-bit calibration. With a 16-bit cutback curve calibration, FIG. 6, each distinct input 15 gray level has a distinct output 17 gray level and there is no compression of the output values and no tonal loss at the press.

There are 256 increments from 0 to 100 gray level in 8-bit gray scale processing. Thus at 8-bits, each 1 percent of input gray value translates to 0.3906 percent of output gray value. There are 65,536 increments from 0 to 100 percent in 16-bit gray scale processing. Thus at 16-bits, each 1 percent of input gray value translates to 0.001526 percent of output gray value.

Image data manipulation is carried out in the desktop computer in 8-bits because those 256 increments sufficiently separated 0 to 100 percent in less than 1 delta E unit. The press operation in 8-bit is also satisfactory, as again the halftone printing is sufficiently sensitive to be visually acceptable.

The present invention provides a 16-bit interim environment for cutback curve calibration and halftone screening prior to passing the gray level image data to an imagesetter.

However, it has also been discovered that by manually or electronically adjusting the laser exposure intensity on the image setter, the performance of the imagesetter as viewed at the press, deviates from linear and introduces an analog nonlinear attenuation of gray level values processed by the imagesetter. The imagesetter crates various analog cutback curves which reduce the gray values processed by the imagesetter.

Figure 7:
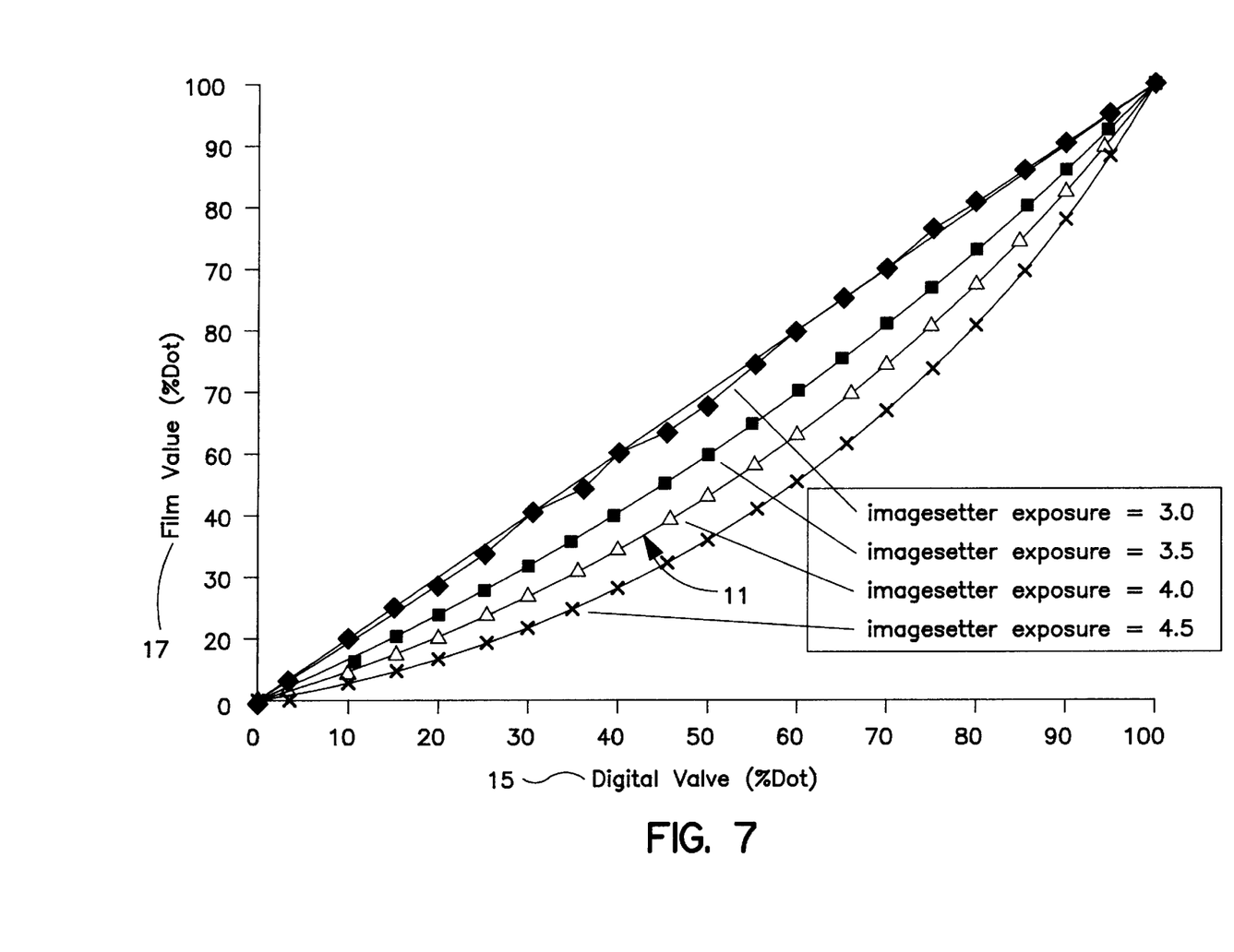
FIG. 7 shows various cutback curves introduced into imagesetter operation by adjustments in laser exposure intensity.

FIG. 7 shows various naturally occurring cutback curves which define the imagesetter calibration for a selection of exposure settings. The exposure setting of 4.0 creates the cutback curve 11 of FIG. 2 which is shown with other calibration curves. Curve 11, FIG. 7, is the desired industry standard. It reduces the linear gray value output 17 by about 15 percent at 50 percent gray value input 15.

Figure 8:
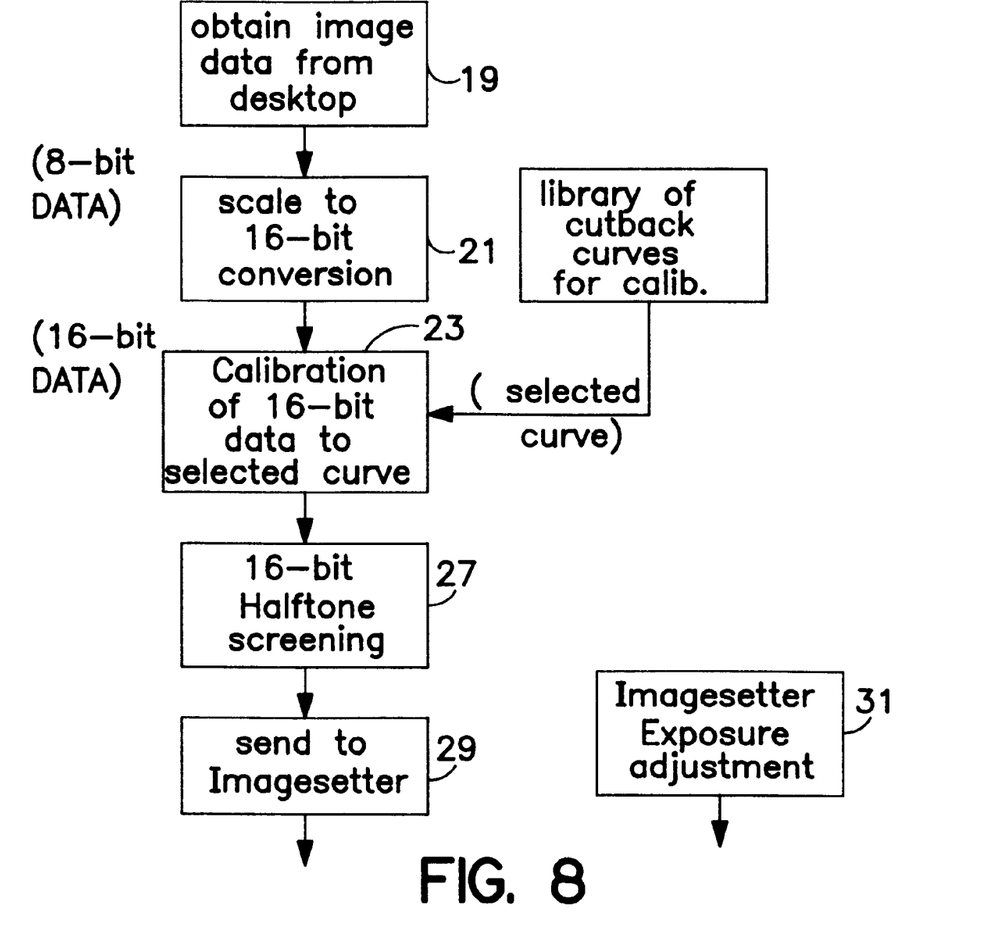
FIG. 8 is a block diagram for the process steps of the invention.

The steps of the invention process are shown in FIG. 8. Eight bit image data, in continuous gray tone is obtained 19 from a desktop computer. This information is scaled 21 or translated from 8-bit data to 16-bit data in a converter circuit. The 16-bit data is calibrated 23 according to a selected cutback curve selected 25 from a library of cutback calibration curves. The calibrated 16-bit image data is then halftone screened 27 the application of known screening patterns and process. The halftone gray level image information is then input or sent 29 to the imagesetter.

Supplemental to these steps, the imagesetter exposure is adjusted 31, FIG. 8.

The process can select a target calibration curve which is considered to be the average cutback curve for the printing process used. The actual nonlinear calibration curve (cutback curve) is empirically based.

The imagesetter is set up such that its natural curve is as close as possible to the target calibration curve. For most imagesetters, this means increasing the exposure. The imagesetter is calibrated in the normal way by outputting gray scale values to film or plate with no curve or adjustment of any kind applied. The film is read on a densitometer to determine the dot values at each scale. The comparison of the dot value read on film to the digital values output to film is called the imagesetter self curve.

Figure 9:
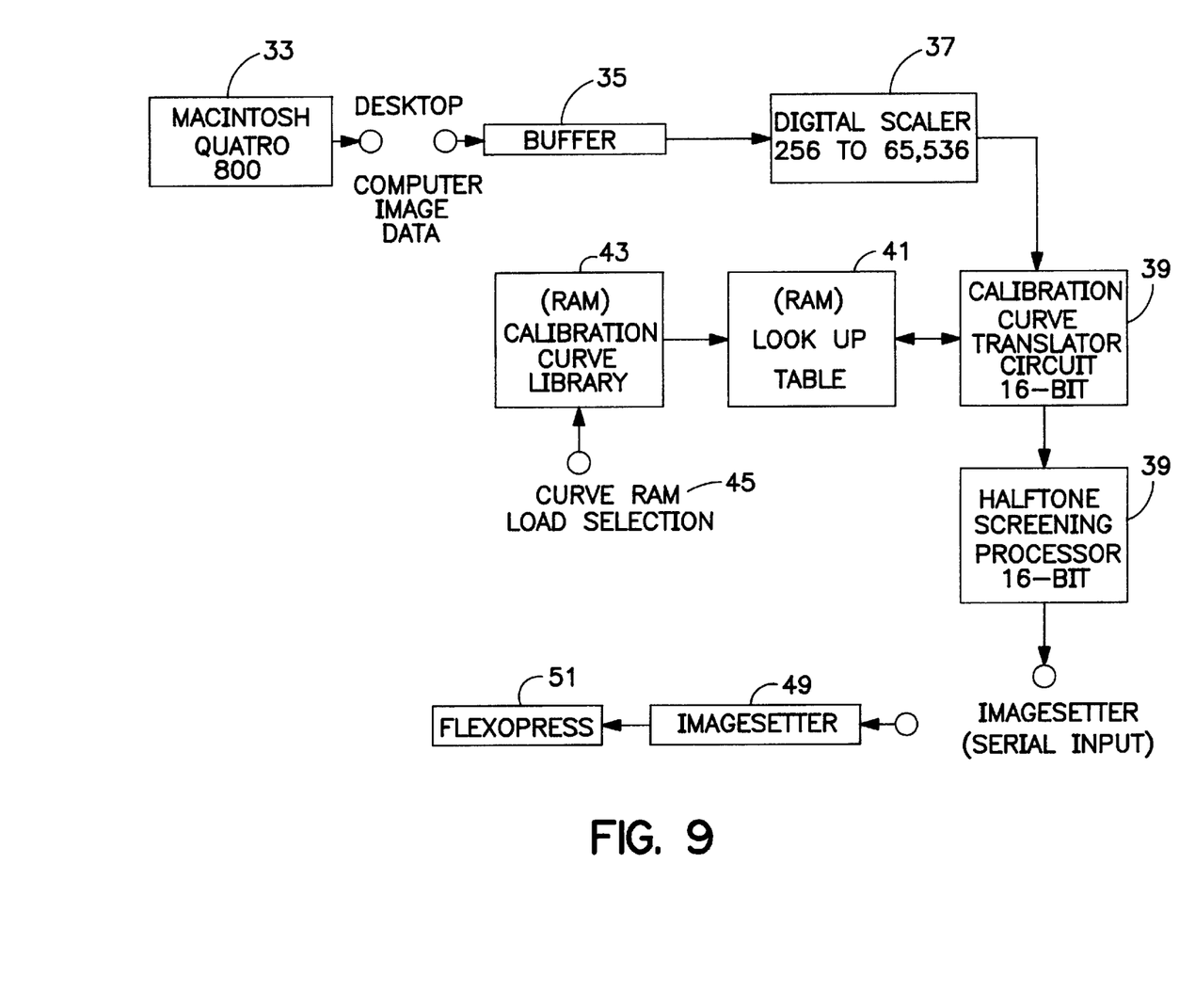
FIG. 9 is a block diagram for hardware implementation of the process steps.

The target calibration curve can be stored in the imagesetter calibration software 43, FIG. 9. In calibrating the imagesetter, the mathematical algorithm which describes the calibration alters the imagesetter self curve by the target calibration curve to derive the final transfer function (calibration curve). buffer 35. The output of the buffer 35 is connected to a digital scale conversion circuit 37 which converts the 8-bit image data to 16-bit image data. The 16-bit output of the scale conversion circuit 37 is fed to a 16-bit calibration curve translator circuit 39 which calibrates the image data according to look-up table data held in a RAM 41 connected thereto. This memory 41 receives cutback curve data from a library memory 43 connected to it. The loading of a selected curve from the library memory 43 to the calibration memory 41 is controlled by operator load selection 45.

The calibration circuit 39 output is sent to a 16-bit halftone screening processor 47. The halftone screening processor 47 is known in the art. Its output is fed to the imagesetter 49 connected to the flexo-press 51.

Many changes can be made in the above description without departing from the scope or the intent of the invention. This disclosure is intended to be read as illustrative of the invention and is not to be interpreted in the limiting sense.

What is claimed is:

1. A method of calibrating the output for an imagesetter in a printing system, having an 8-bit source of continuous gray value image data, an imagesetter which previously directly received said image data and a press fed from said imagesetter, which press requires the calibration of the imagesetter operation to compensate for press gain, consisting of the steps of:

obtaining said 8-bit gray value image data;

converting said 8-bit gray value image data obtained in to 16-bit format;

establishing a target curve for reducing each individual gray value of said converted image data prior to sending said value to the imagesetter;

calibrating said converted 16-bit image data to said target curve;

halftone 16-bit screening said calibrated 16-bit image data; and providing said halftone screened image data to said imagesetter.

2. The method of claim 1, wherein after the step of 16-bit screening there is included the step of: adjusting the exposure intensity of said imagesetter to attenuate gray tone image data values processed by said imagesetter, said exposure adjusting step being performed prior to said providing step.

3. An apparatus for providing calibrated imagesetter output to a printing press, for compensating for press gain digital dot imaging and for calibrating to eliminate 8-bit tonal loss at the press, comprising:

a buffer circuit connected to receive 8-bit digital image data from a desktop publishing type computer;

a conversion circuit connected to said buffer circuit for converting said digital image data from 8-bit image data to 16-bit image data;

a 16-bit calibration processor circuit connected to receive said 16-bit image data from said conversion circuit, said calibration processor reducing the gray values of said image data according to a cutback calibration curve;

a first memory connected to said calibration processor circuit for holding a look-up table defining a cutback calibration curve used by said calibration processor circuit;

a second memory connected to said first memory for holding a library of different cutback calibration curves, individually selectable for loading into the look-up table of said first memory; and a 16-bit halftone screening processor connected to receive the calibrated image data from said calibration processor circuit for halftone screening said calibrated image data;

wherein said halftone screening processor can provide an output to said imagesetter.

4. A process for calibrating gray tone digital image data for an imagesetter without significant tonal loss, consisting of the steps of:

receiving 8-bit gray tone image data;

converting said 8-bit gray tone image data to 16-bit gray tone data;

calibrating said 16-bit gray tone image data to a cutback curve to compensate for digital format press gain which said imagesetter is not capable of compensating for;

halftone screening said calibrated 16-bit image data; and passing said 16-bit halftone screened and calibrated image data gray values to said imagesetter.

5. The method of claim 4, wherein after the step of halftone screening and before the step of passing is performed the step of: adjusting the exposure intensity of said imagesetter to attenuate gray tone image data values processed by said imagesetter.

* * * * *